United States Patent [19]

Barraza et al.

[11] Patent Number: 4,695,222

[45] Date of Patent: Sep. 22, 1987

[54] RECIRCULATING TOILET PUMP ASSEMBLY

[75] Inventors: Arthur Barraza, Arleta; Calvin T. Kearney, Glendale, both of Calif.

[73] Assignee: Kidde, Inc., Saddle Brook, N.J.

[21] Appl. No.: 785,580

[22] Filed: Oct. 8, 1985

[51] Int. Cl.⁴ .......................................... B01D 29/38
[52] U.S. Cl. ............................ 415/80; 415/121 G; 415/219 R; 210/408; 210/414
[58] Field of Search .................. 415/80–82, 415/121 R, 121 G, 219 R; 210/408, 413, 414, 415

[56] References Cited

U.S. PATENT DOCUMENTS

| | | | |
|---|---|---|---|
| 2,066,479 | 1/1937 | MacIsaac | 210/414 X |
| 3,586,172 | 6/1971 | Young | 210/415 |
| 3,722,681 | 3/1973 | Boorujy | 210/408 X |
| 3,784,016 | 1/1974 | Akiyama | 210/415 X |
| 4,003,837 | 1/1977 | Osborne | 210/408 |
| 4,085,050 | 4/1978 | Gervasi | 210/414 X |

Primary Examiner—Robert E. Garrett
Assistant Examiner—Joseph M. Pitko
Attorney, Agent, or Firm—Lyon & Lyon

[57] ABSTRACT

A recirculating pump assembly in a self contained recirculating sewage system includes a filter surrounding a pump housing positioned in a sewage holding tank. A water rotated filter rinse assembly including a filter rinse member having a plurality of tangential spray holes is rotatably positioned around the housing of the water pump assembly and spaced adjacent the inside surface of the filter. After the sewage holding tank is emptied, rinse water is supplied to the filler rinse assembly. The rinse water in flowing out the spray holes rotates the filter rinse member to clean the filter and the holding tank. The filter rinse assembly includes a water inlet passage with an anti-syphon valve. The pump assembly includes a coupling to drivably connect the pump motor and the pump.

16 Claims, 6 Drawing Figures

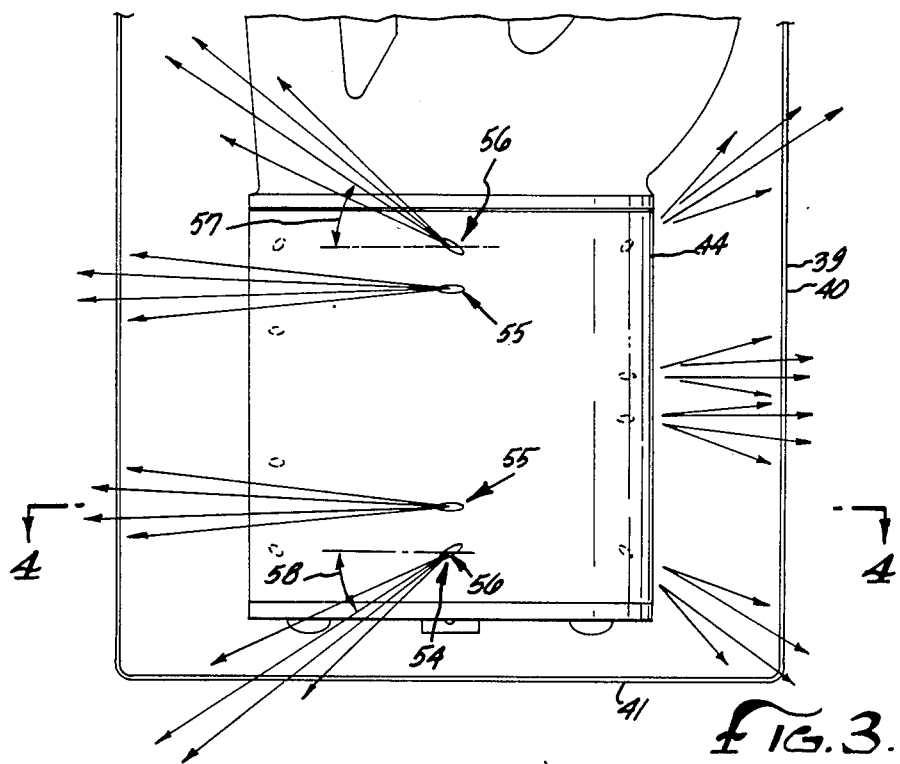
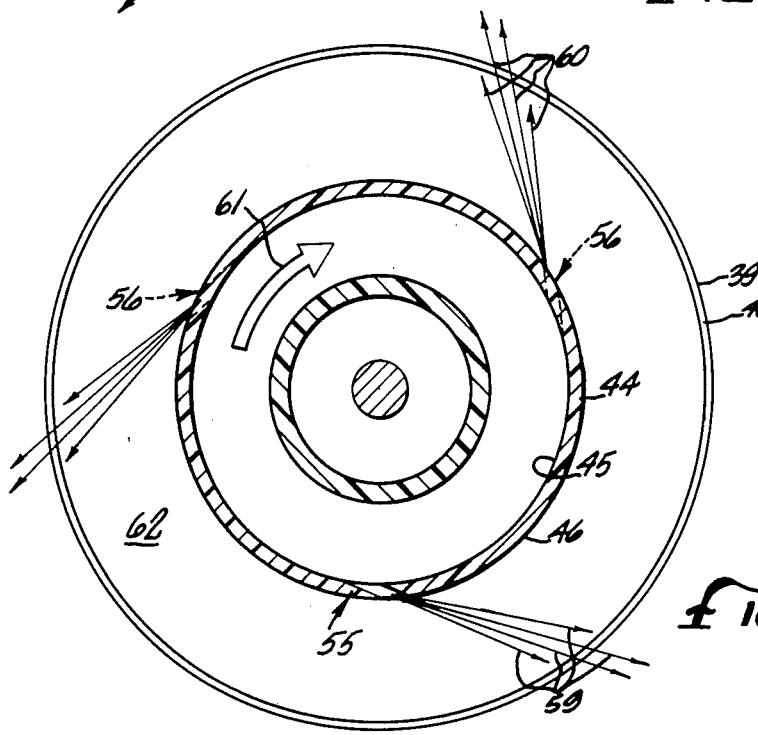

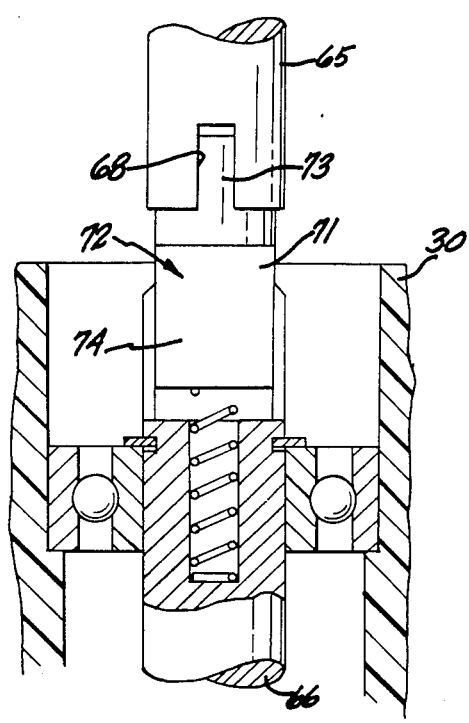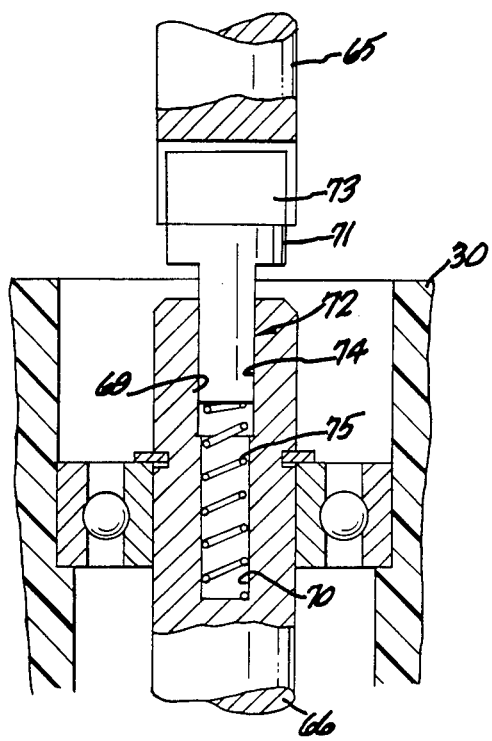

RECIRCULATING TOILET PUMP ASSEMBLY

BACKGROUND OF THE INVENTION

The field of the present invention is a self contained recirculating toilet system such as those used in commercial aircraft and, in particular the recirculating pump assembly therefore.

In one prior recirculating pump assembly described in U.S. Pat. No. 3,429,445, a self cleaning filter surrounds the pump assembly. The filter includes a series of filtering slots which are cleaned by relative rotation with cleaning teeth that extend through the slots. Although the filter is effective when operative, it is complex and subject to mechanical failure. Once failure occurs the filter clogs with waste material which prevents water flow. This requires disassembly of the water pump assembly, cleaning the filter and repair of the failed parts. One solution to improve this prior art unit included installing an additional filter basket surrounding the filtering slots. But this solution is not fully satisfactory since once the filter basket clogs from waste material disassembly is again required for cleaning.

Another prior art recirculating pump assembly which attempts to overcome these problems utilizes a screen basket filter surrounding the pump assembly. The pump assembly has a housing which includes four parallel tubular members extending downward within the screen basket. One of these four tubular members is a cylindrical water powered rotating spray member. This spray member is rotated by the rinse water supply to clean the screen basket. Although this prior art pump assembly provides a spray cleaning of the screen basket it is not fully effective since portions of the screen basket which are shielded from the water spray by the other three tubular members are not cleaned. In addition the rotating spray is positioned eccentric to the axis of the screen basket whereby only the nearby portion of the screen basket which receives the full force of the spray is adequately cleaned. The other portions are only partially to inadequately cleaned.

SUMMARY OF THE INVENTION

The present invention is directed to a recirculating pump assembly for a self contained recirculating sewage system in which a screen filter surrounds the pump assembly. The filter is cleaned by a rotating filter rinse member spaced adjacent the inside walls of the filter. The rotating filter rinse member has tangential rinse water spray means. Rinse water flow through the spray means provides power to rotate the filter rinse member. The present invention not only provides a high velocity water spray to very efficiently clean the total surface of the adjacent filter, the water spray also cleans the interior of the holding tank. The present invention provides a positive cleaning of the filter. This eliminates the need for disassembly of the water pump assembly for cleaning, which results in a substantial cost saving.

BRIEF DESCRIPTION OF THE DRAWINGS

FIG. 3 is an enlarged side elevational view of the lower portion of the pump assembly shown in FIG. 2 and illustrating the rinsing spray in operation.

FIG. 4 is a sectional plan view taken substantially on line 4—4 of the pump assembly shown in FIG. 3.

FIGS. 5 and 6 are enlarged fragmentary sectional elevation views of a portion of the drive for the pump assembly with the components rotated 90° between FIGS. 5 and 6.

DETAILED DESCRIPTION OF THE PREFERRED EMBODIMENT

Figure 1:
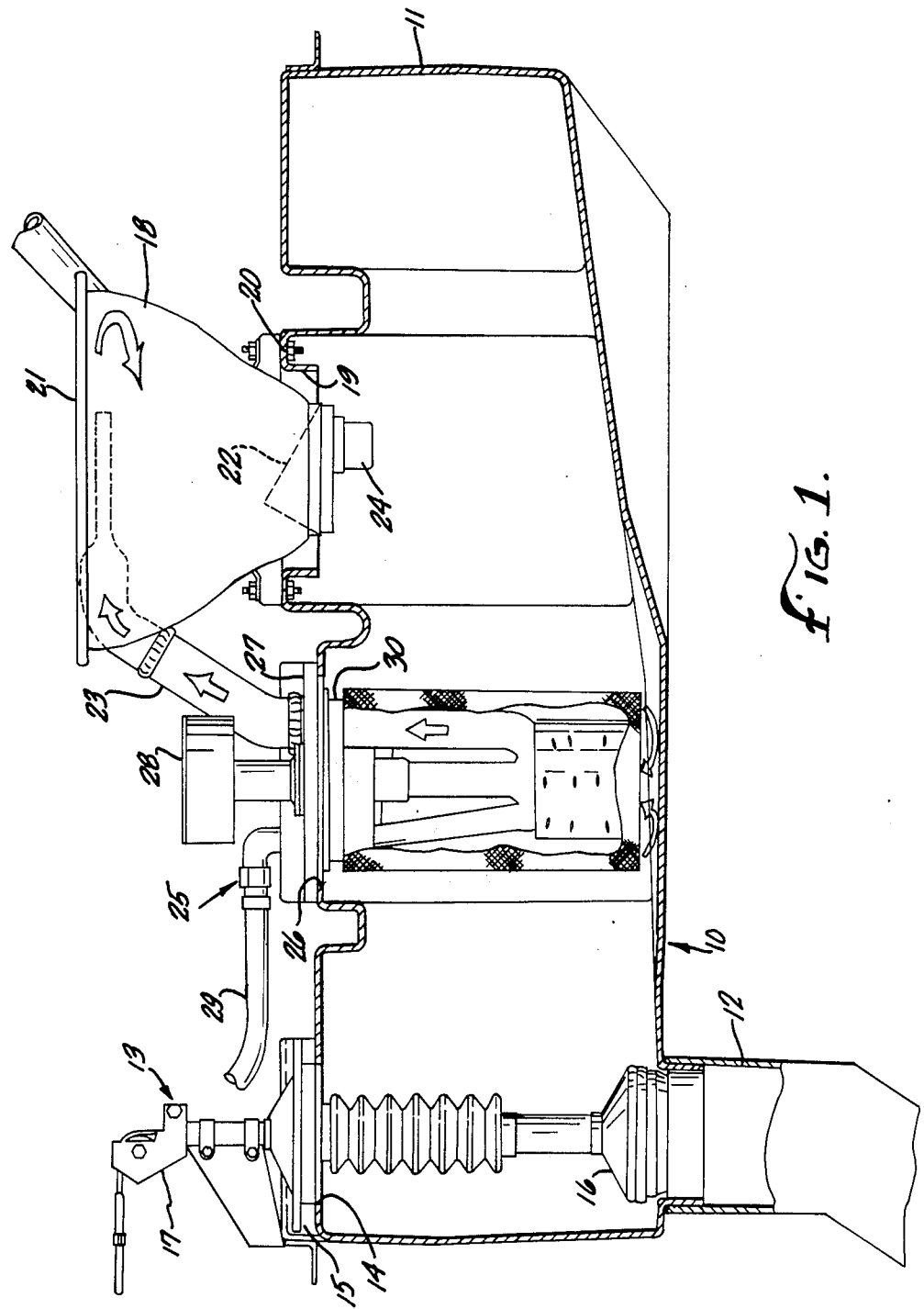
FIG. 1 is a side elevational view in partial cross section of a self contained recirculating sewage system employing the recirculating pump assembly of the present invention.

Turning in detail to the drawings, FIG. 1 illustrates a self-contained toilet or sewage system 10 of the general type used in commercial airplanes. The sewage system 10 includes a holding tank 11 having a holding tank drain 12. A drain valve assembly 13 is positioned in a first hole 14 in the top of the holding tank 11 and sealably attached at a first flange 15. The drain valve assembly 13 includes a drain valve 16 for closing the drain 12 in the holding tank 11 and a drain valve operating assembly 17.

A toilet bowl 18 is positioned in a second hole 19 in the top of the holding tank 11 and sealably attached at a second flange 20. The toilet bowl 18 includes a removable flush ring 21, a flapper type outlet valve 22 in the bottom, a flush water inlet pipe 23 and a toilet bowl overflow outlet pipe 24 connecting to the holding tank 11.

A recirculating pump assembly 25 is positioned in the holding tank 11 and sealably attached to a third hole 26 in the top of the tank at a third flange 27.

The pump assembly 25 includes a pump drive motor 28 positioned above the third flange 27 as shown in FIG. 1. The pump assembly 25 also includes a rinse water inlet pipe 29 for supplying water at a high pressure to rinse and flush the holding tank 11, as well as for recharging the tank for the next use cycle. It is preferred that the supply water pressure be in the range of 40-50 p.s.i. The pump assembly 25 includes a housing 30 extending downwardly from the third flange 27 into the holding tank 11.

Figure 2:
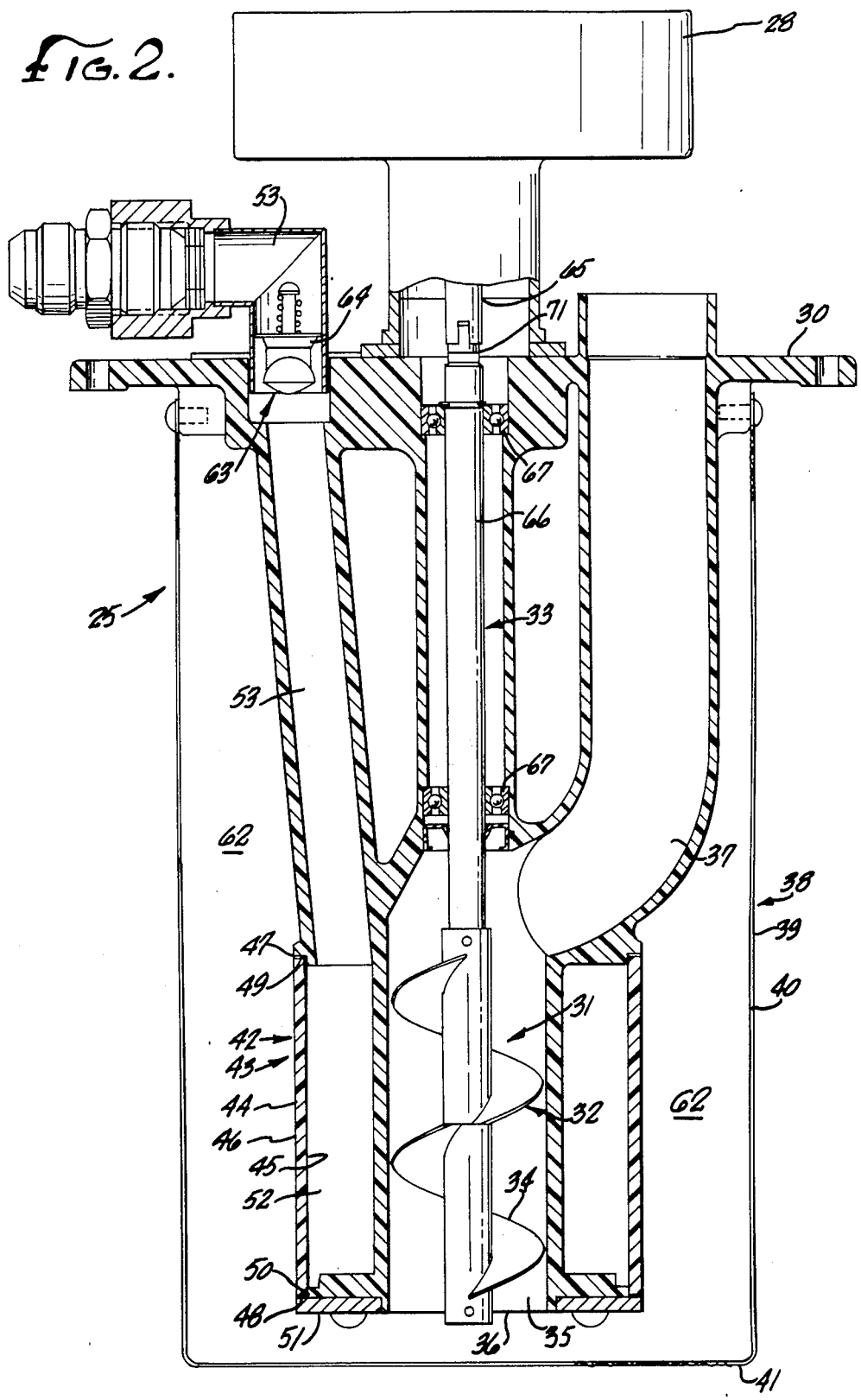
FIG. 2 is an enlarged sectional elevational view of the pump assembly shown in FIG. 1.

Referring to FIG. 2, the pump assembly housing 30 is mounted substantially vertical in the holding tank 11. The pumping means 31 is mounted in the housing 30 and includes an impeller 32 and drive shaft 33. The impeller 32 is of a screw or auger type and is positioned in a pump chamber 35 in the housing 30. The pump chamber 35 includes a pump inlet 36 at the lower end of the housing 30, and a pump outlet passageway 37 extending to one side and then upwardly in the housing 30 for connecting to the flush water pipe 23 to supply flushing water to the toilet bowl 18.

Filter means 38 is mounted on the housing 30 to surround the housing 30 and to enclose the pump water inlet 36. In the preferred embodiment the filter means 38 is formed in the shape of a filter basket 39. The filter basket has a porous vertical side wall 40 and a porous horizontal bottom wall 41. The filter basket 39 is preferably made of a mesh screen material which is attached around the upper periphery of the housing 30 adjacent the third flange 27. The filter basket 39 surrounds the housing 30 to separate the water inlet 36 from the holding tank 11.

Filter rinse means, generally designed 42, is provided within the filter basket 39 to provide rinse water spray towards the filter basket 39. The water spray when it forceably strikes the filter basket 39 passes through the porous side walls 40 and bottom walls 41 to clean toilet paper and other waste and residue from the porous openings. Continued spray of fresh water through the porous openings also forceably contacts the interior surface of the holding tank 11 to wash all waste and residue from these surfaces.

In the preferred embodiment, the filter rinse means 42 comprises a cylindrical filter rinse means 43 which includes a cylinder member 44. The cylinder member 44 has an inside surface 45, an outside surface 46, a first or top end surface 47 and a second or bottom end surface 48. The cylinder member 44 is rotatably mounted on the housing 30 as shown in FIG. 2. The top end surface 47 mounts on the housing 30 on a circular bearing recess 49 and the bottom end surface 48 mounts within the housing on a circular bearing recess 50. A retaining plate 51 attaches to the lower end of the housing 30 to form the circular bearing recess 50 and to retain the cylinder member 44.

The filter rinse means 42 also includes a cylindrical water chamber 52 formed in the housing 30 and a fresh water inlet passage 53 which extends upwardly in the housing from the cylindrical water chamber 52 to connect with the fresh water inlet pipe 29. The cylindrical member 44 surrounds the cylindrical water chamber 52.

The cylinder member 44 is powered or driven by the fresh water to rotate around the housing 30 on the circular bearing recesses 49 and 50. The cylinder member 44 includes a plurality of rinse water spray means 54 positioned for causing tangential water flow. The rinse water spray means 54 is best shown in FIG. 3 and FIG. 4. The rinse water spray means 54 includes a plurality of rinse water holes 55 positioned for tangential water flow and plurality of rinse water holes 56 positioned for angular tangential water flow. The holes 55 positioned for tangential water flow are approximately tangent to the inside surface 45 of the cylinder member 44 and in a plane perpendicular to the axis of rotation of cylinder 44. The holes 56 positioned for angular tangential water flow are approximately tangent to the inside surface 45 of the cylinder member 44 but are also directed upwardly and downwardly. The holes 56 are positioned at a upward angle near the top of cylinder member 44 as shown by the angle 57 and at a downward angle near the bottom of cylinder member 44 as shown by the angle 58. The preferred upward and downward angles 57 and 58 are in the range of 5–25 degrees to provide a complete coverage of the filter basket 39.

Referring to FIG. 4 the holes 55 and 56 are shown with one edge tangent to the inside surface 45 of the cylinder member 44. The arrows 59 represent water flow through the holes 55 and the arrows 60 represent water flow through the holes 60. Rinse water exiting the holes in the direction of arrows 59 and 60 provide a rotational force to rotate the cylinder member 44 around the housing 30 on top and bottom end surfaces 47 and 48 in the clockwise direction as shown by rotational arrow 61.

As shown in FIGS. 3 and 4 the cylinder member 44 is substantially concentric and spaced from the cylindrical porous vertical side wall 40 of the filter basket 39. This space 62 permits recirculating water flow from the holding tank 11 through the filter basket 39 and into the pump water inlet 36. The space, if it is too large, reduces the force of the fresh water spray to and through the filter basket 39 to flush the filter basket 39 and the walls of the holding tank 11. In the preferred embodiment the space is in the range of ½ to 1 inch.

Since the holding tank 11 is normally sealed, a treated water charge is maintained in the tank and flushing the toilet recycles this water charge. When the self contained sewage system 10 is used in an aircraft, the aircraft flying at high altitude provides decreased air pressure outside the holding tank 11. If the fresh water inlet pipe 29 which leads to the outside of the aircraft is inadvertently left open or opens, this reduced pressure will create a suction which will pull the water from the holding tank 11. To prevent this occurring, an anti-syphon valve 63 is positioned in the fresh water supply. It is preferred that the anti-syphon valve 63 be positioned in the fresh water inlet passage 53 in the housing 30 as shown in FIG. 2. The preferred anti-syphon valve 63 is a check valve 64.

As previously described, a pump drive motor 28 drivably connects to the pump means 31 through the drive shaft means 33.

Referring to FIGS. 2, 5 and 6, the pump drive motor 28 includes a motor shaft 65 and the drive shaft means 33 includes a drive shaft 66 and bearings 67. The motor shaft 65 includes a slot 68 and the drive shaft 66 includes a slot 69 and an axial bore 70. The motor shaft 65 and the drive shaft 66 are rotatably connected by coupling means 71. The coupling means 71 provides axial length accommodation means 72 to accommodate a variation in the end spacing between the ends of the motor shaft 65 and the drive shaft 66. The coupling means 71 includes a first tongue shaped member 73 for engagement with the slot 68 in the motor shaft 65, a second tongue shaped member 74 for engagement with the slot 69 in the drive shaft 66 and a compression spring 75 positioned in the axial bore 70 in the drive shaft 66. The compression spring 75 bears against the end of the second tongue shaped member 74 to maintain full engagement of the first tongue shaped member 73 within the slot 68 in the motor shaft 65. The axial length accommodation means 72 includes the second tongue shaped member 74 which is sufficiently long to maintain engagement with the slot 69 in the drive shaft 66 to accommodate a variation in the normal end spacing between the motor shaft 65 and the drive shaft 66 of plus or minus 1/16 inch although a larger variation can be accommodated. In the preferred embodiment the first and second tongue shaped members 73 and 74 are radially oriented perpendicular to each other.

In the operation of the self contained sewage system 10, a water charge is provided in the holding tank 11. This water charge is recycled to flush the toilet bowl 18. When the toilet bowl 18 is flushed, the pump assembly 25 operates to provide recirculated water from the holding tank 11 to flush the toilet bowl 18. On flushing the toilet bowl 18, recirculated water is pulled through the filter means 38, the chamber 62, and into the pump water inlet 36. The recycled water then enters the pump chamber 35 where it is forced by the impeller 34 upward through the pump outlet passageway 37 into the flush water supply pipe 23 to the toilet bowl 18. This flushing with recycled water occurs every time the toilet bowl is used. Accordingly, toilet paper and other waste and residue is drawn to the filter means 38 and after a period of time this residue accumulates to clog the filter means 38.

The filter rinse means 42 removes this accumulated residue from the filter means 38 as well as from the interior surface of the holding tank 11. The filter rinse means 42 is operated after the holding tank 11 is empty and the drain valve 16 open. The holding tank 11 is emptied by operating the drain valve operating assembly 17 to open the drain valve 16. Once the drain valve 16 is open the holding tank empties through the holding tank drain 12.

To operate the filter rinse means 42 a rinse water service supply is connected to the rinse water inlet pipe 29. Rinse water enters into the rinse water inlet passage 53 in the housing 30 and flows through the anti-syphon valve 63. This rinse water fills the cylindrical water chamber 52. Water pressure forces the rinse water from the cylindrical chamber 52 through the tangential holes 55 and 56 in the cylinder member 44. This causes the rinse water to flow in the directions of arrows 59 and 60 and rapidly rotate the cylindrical member 44. The rotation of the cylindrical member 44 and the water spray from the holes 55 and 56 forceably blast the residue from the filter means 38 and the interior of the holding tank 11. In other words, the rotation of the cylinder member 44 by the high velocity flow of rinse water very efficiently cleans the filter means 38 and the surrounding interior of the holding tank 11. It is preferred that the rinse water has a pressure of about 25 p.s.i. and a flow rate of about 15 gallons per minute.

Thus, a recirculation pump assembly for a self contained recirculating sewage system is disclosed which includes a simple but effective filter rinse means. While embodiments and applications of this invention have been shown and described it would be apparent to those skilled in the art that many more modifications are possible without departing from the inventive concepts herein. The invention, therefore, is not to be restricted by the disclosed embodiment but rather is of the full scope of the claims.

What is claimed is:

1. A pump assembly for use in the holding tank of a self contained recirculating sewerage system, said pump assembly comprising
   a housing for vertical mounting in said tank,
   pump means including an impeller means having flushing water inlet means mounted in the lower end of said housing,
   water powered filter rinse means rotatably positioned around said housing,
   filter means mounted on said housing surrounding and spaced from said water powered filter rinse means, said filter means enclosing said flushing water inlet means.

2. The pump assembly defined in claim 1 wherein said filter rinse means includes a filter rinse cylinder member having a plurality of spray means formed therein for tangential rinse water flow.

3. The pump assembly defined in claim 2 wherein said filter rinse cylinder member has a plurality of spray means formed therein for angular tangential rinse water flow.

4. The pump assembly defined in claim 2 wherein said filter rinse means further includes a water chamber in said housing spaced adjacent the inside surface of said filter rinse cylinder member.

5. The pump assembly defined in claim 1 wherein said filter rinse means further includes a rinse water supply passage in said housing and anti-syphon valve means positioned therein.

6. The pump assembly defined in claim 1 further comprising a pump motor mounting to said housing for driving said pump impeller means, said pump motor including coupling means having axial length accommodation means for drivably connecting said pump motor and said impeller.

7. A pump assembly having a housing positioned downwardly in a holding tank, said pump housing including a pump inlet at the lower end, said pump assembly comprising
   a filter basket having a cylindrical porous side wall concentrically surrounding said pump housing and enclosing said pump inlet, and
   a water rotated filter rinse cylinder member positioned spaced concentrically adjacent the inside of said cylindrical side wall of said filter basket, said filter rinse cylinder member having a plurality of rinse water spray hole means therein aligned tangentially away from the direction of rotation of said rinse water cylinder member.

8. The pump assembly of claim 7 wherein said rinse water cylinder member further includes a plurality of rinse water spray hole means therein aligned angled tangentially away from the direction of rotation of said rinse water cylinder member.

9. The pump assembly of claim 8 wherein said housing includes a rinse water inlet passage with an anti-syphon valve positioned therein.

10. The pump assembly of claim 9 wherein said anti-syphon valve is a check valve.

11. The pump assembly of claim 9 including a pump drive motor and a pump means, said pump assembly further comprising a coupling means drivably connecting the drive motor and the pump means, said coupling means including a first tongue means for engaging a slot in the shaft of the drive motor, a second tongue means for engaging a slot in the shaft of the pump means, and spring means for maintaining one of said tongue means fully engaged.

12. In a self contained recirculating sewage system including a recirculating pump assembly having a housing positioned in a holding tank and filter means surrounding the housing, a filter rinse assembly comprising a filter rinse member having means for allowing rotation about the housing, said filter rinse member having a side wall spaced adjacent the inside surface of the filter means, said sidewall formed with a plurality of tangential rinse water spray holes, said holes providing rotation of said filter rinse member and rinsing of said filter means.

13. In the self contained recirculating sewage system of claim 12 wherein the filter means has a cylindrical wall concentric with the housing, said filter rinse assembly comprising a filter rinse member having a cylindrical side wall spaced concentrically adjacent the inside surface of the cylindrical wall of the filter means.

14. In the self contained recirculating sewage system of claim 12, said filter rinse assembly further comprising a rinse water inlet passage supplying a water chamber adjacent the inside surface of said filter rinse member to provide pressurized rinse water to all of said plurality of spray holes.

15. In the self contained recirculating sewage system of claim 12, said filter rinse assembly further comprising an anti-syphon valve positioned in said rinse water inlet passage.

16. In the self contained recirculating sewage system of claim 12, said filter rinse assembly comprising said filter rinse member spaced from said filter means at a spacing permitting recirculating water flow from the filter into the pump assembly and rinse water spray flow from said filter rinse member through said filter means and forceably against the interior walls of the holding tank.

* * * * *